United States Patent
Teulet

(10) Patent No.: US 9,327,451 B2
(45) Date of Patent: May 3, 2016

(54) METHOD FOR MANUFACTURING AN OBJECT BY SOLIDIFYING A POWDER USING A LASER

(75) Inventor: Patrick Teulet, Riom (FR)

(73) Assignee: PHENIX SYSTEMS, Riom (FR)

( * ) Notice: Subject to any disclaimer, the term of this patent is extended or adjusted under 35 U.S.C. 154(b) by 351 days.

(21) Appl. No.: 13/824,444

(22) PCT Filed: Apr. 18, 2012

(86) PCT No.: PCT/EP2012/057030
§ 371 (c)(1),
(2), (4) Date: Jun. 12, 2013

(87) PCT Pub. No.: WO2012/143365
PCT Pub. Date: Oct. 26, 2012

(65) Prior Publication Data
US 2013/0277891 A1    Oct. 24, 2013

(30) Foreign Application Priority Data

Apr. 19, 2011    (FR) ...................................... 11 53365

(51) Int. Cl.
*B29C 47/92*    (2006.01)
*B29C 67/00*    (2006.01)
*B22F 3/105*    (2006.01)

(52) U.S. Cl.
CPC ........... *B29C 67/0077* (2013.01); *B22F 3/1055* (2013.01); *Y02P 10/295* (2015.11)

(58) Field of Classification Search
CPC .. B29C 67/0077; B22F 3/1055; Y02P 10/295
See application file for complete search history.

(56) References Cited

U.S. PATENT DOCUMENTS

| 5,993,554 | A | * | 11/1999 | Keicher et al. ................. 118/641 |
| 7,084,370 | B2 | | 8/2006 | Hagemeister et al. |
| 7,789,037 | B2 | | 9/2010 | Teulet |
| 2005/0208168 | A1 | * | 9/2005 | Hickerson et al. ......... 425/174.4 |
| 2010/0202914 | A1 | | 8/2010 | Yamaoka et al. |
| 2010/0272519 | A1 | * | 10/2010 | Ederer et al. .................. 406/154 |
| 2012/0113439 | A1 | | 5/2012 | Ederer |

FOREIGN PATENT DOCUMENTS

| DE | 100 42 132 A1 | 3/2002 |
| EP | 1 358 855 A1 | 11/2003 |
| EP | 1 641 580 B1 | 6/2008 |
| WO | 2009/010034 A2 | 1/2009 |

OTHER PUBLICATIONS

International Search Report, dated Nov. 13, 2012, from corresponding PCT application.

* cited by examiner

*Primary Examiner* — Galen Hauth
(74) *Attorney, Agent, or Firm* — Young & Thompson

(57) ABSTRACT

This process for manufacturing an object by solidifying a powder (P) includes steps of: a) depositing a powder layer (P) on a working zone (Z); b) compacting this layer; c) solidifying a first zone (7) of the compacted layer using a laser; d) solidifying at least one second zone (11, 12, 13) of the compact layer, this second zone (11, 12, 13) making contact with the zone (7) solidified in step c), under solidifying conditions chosen so that this second solidified zone (11, 12, 13) is less strong than the first solidified zone (7); e) repeating steps a) to d) until the object (1) is obtained; and f), after step e) and when the object (1) is finished, removing the second zones (11, 12) with respect to the first zones (7).

17 Claims, 4 Drawing Sheets

METHOD FOR MANUFACTURING AN OBJECT BY SOLIDIFYING A POWDER USING A LASER

Figure 1:
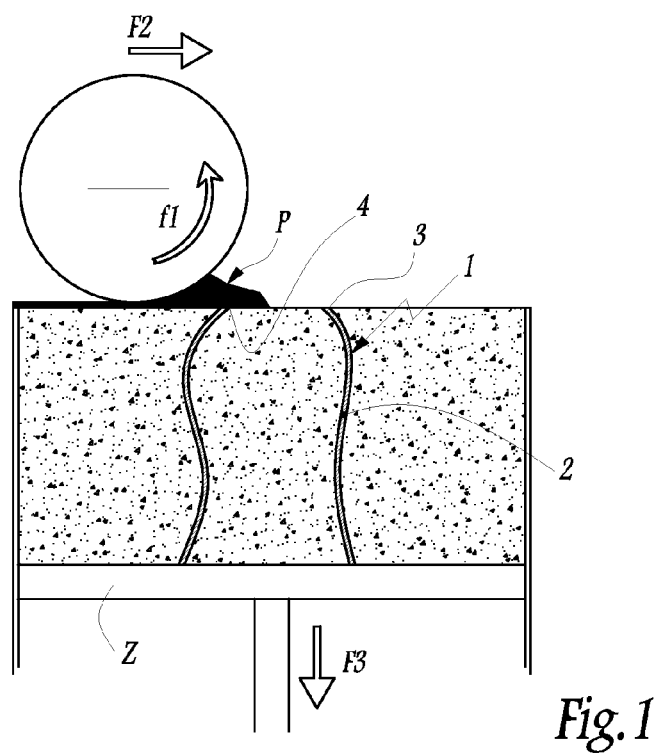

The invention relates to a method for manufacturing an object by solidifying a powder using a laser.

The term "powder" denotes herein a powdery material consisting of one or a plurality of elements and a mixture of a plurality of powdery materials. In other words, the term "powder" denotes a powder or a powder mixture. These powders may be metallic or mineral, for example a ceramic powder.

Producing objects having more or less complex shapes from a powder by solidifying by melting under the effect of the thermal energy provided by a laser, some areas of the powder being previously spread into thin layers, is known. Hereinafter, the term "sintering" denotes such solidification by means of laser treatment.

Each layer of powder is sintered, only on the areas intended to form the walls of the finished object, before spreading and compacting a further layer of powder. The term wall denotes herein a part of a constituent element of an object. This element may be solid, have various geometric shapes or define, at least partially, a volume. If seeking to produce, by means of this method, objects having at least a thin wall, i.e. a wall less than 1 mm thick, or objects wherein the ratio of the height or diameter of the object in relation to the thickness of the wall is greater than five, or complex shapes with undercut areas, difficulties implementing known methods are observed.

These difficulties relate to sintering of the powder and induce the appearance of defects in the object produced, particularly a weakness of some walls of the object. Indeed, the use of a laser to supply, locally and rapidly, the energy required to solidify the area intended to form the wall of the object induces a significant local temperature rise of up to several hundred degrees Celsius. Such a temperature rise may give rise to residual stresses particularly if these walls are thin and thus localised deformations of the walls of the object.

Moreover, in the so-called undercut areas, i.e. in the areas where the wall of the object overhangs an area of non-solidified powder, deformations are also observed. Indeed, when the laser beam works on the powder, a temperature rise, due to radiation, of the powder in the area adjacent to that undergoing sintering occurs. This temperature rise is particularly substantial when the adjacent areas are areas situated under those previously sintered, in other words, when the adjacent areas to the area to be sintered are situated in the lower layers of the powder in relation to the sintered layer constituting the wall of the object. In these lower layers, the powder is situated under an area overhanging the wall, i.e. in an undercut area. A material in powder form has a lower thermal conductivity than that of the same solidified material, thus having a higher density. This is due to the presence of gas, for example air or nitrogen, between the particles of powder material. This difference in thermal conductivity enables solidification of the powder spread in an upper layer, during sintering, over the previously sintered layer and forming the wall being produced but also gives rise to solidification of the powder situated in the lower layer, under that sintered forming the wall. For this reason, unplanned solidified areas appear, for example burrs or raised surfaces.

DE-A-100 42 132 discloses a method for manufacturing an object by solidifying a powder. A first layer of powder is deposited. A first area of the layer, corresponding to a section of a constituent part of the finished object, is then solidified using a laser. At least one second area of the layer is also solidified, the second area being in contact with the first solidified area. The solidification conditions are suitable such that the second solidified area has a lower mechanical resistance than the first solidified area. The finished object thus comprises a central area, situated in the core of the object, and a layer of surface coating surrounding the central area. The central area is partially solidified, whereas the surface coating layer is completely solidified, providing a high degree of hardness for machining the outer surface of the object. This object is in the form of a solid volume and thus does not comprise thin walls. Consequently, the difficulties implementing known sintering methods are not found.

The invention aims to remedy the drawbacks mentioned above with a method for producing objects having thin walls and/or complex shapes and/or large volumes, not having any structural defects.

For this purpose, the invention relates to a method for manufacturing an object by solidifying a powder or a powder mixture, as defined in claim 1.

In this way, a second solidified area, having a lower resistance, is produced about the area forming a section of a constituent part of the object. This second solidified area is sufficiently resistant to support the first solidified area, thus preventing any deformation during the method for manufacturing the object. Such a second area, even if it is mechanically weaker than the first area, has a thermal conductivity closer to that of the first area than the thermal conductivity of the powder or powder mixture. For this reason, the difference between the thermal conductivities is sufficiently small so as not to give rise to a structural defect in the object.

Advantageous, but optional, aspects of this method are defined in claims 2 to 15.

Figure 2:
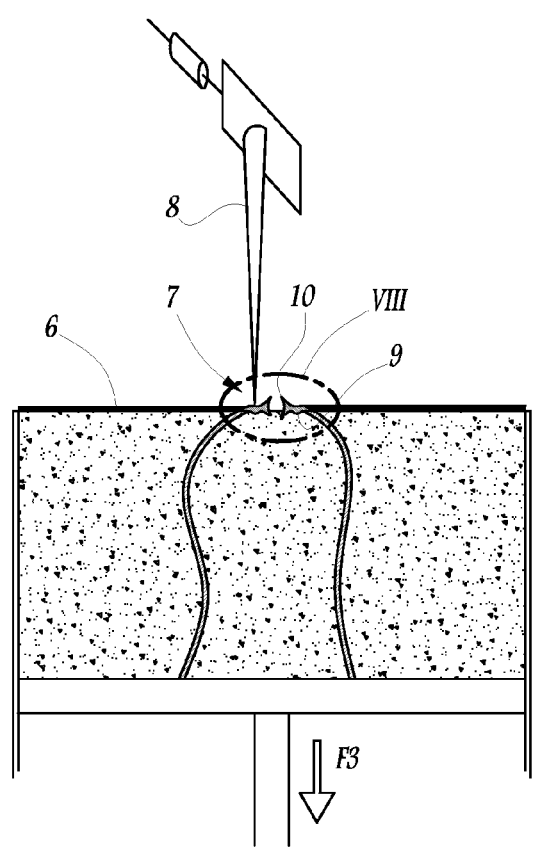

The invention will be understood better and further advantages thereof will emerge more clearly on reading the description hereinafter of two embodiments of a manufacturing method by solidifying powder using a laser according to the invention, given merely as an example and with reference to the appended figures wherein:

FIGS. 1 and 2 are schematic side illustrations, respectively, of a step for depositing a layer and a step for solidifying the layer using a laser by means of a method according to the prior art, wherein defects in the wall of the finished object are represented, FIGS. 3 to 6 are schematic illustrations, at the same scale, of the steps of the manufacturing method according to the invention, i.e. the spreading of the layer and the sintering of the first layer of powder and spreading of a second layer of powder.

Figure 8:
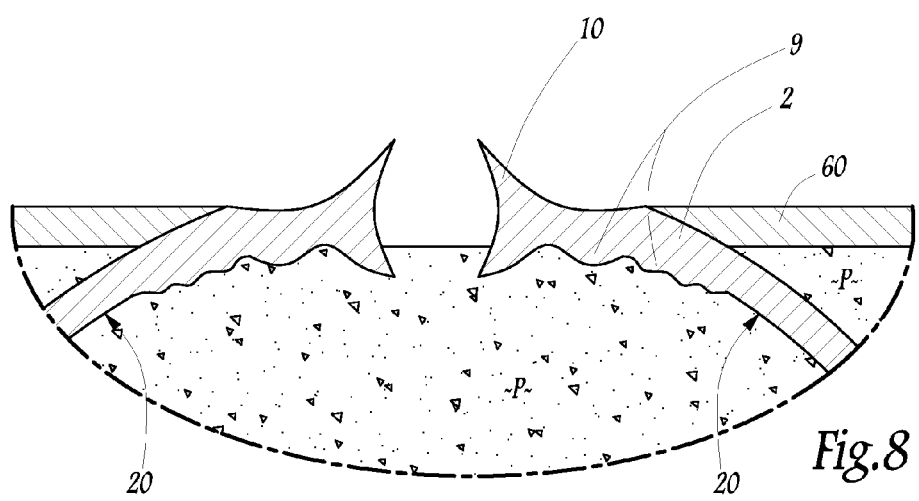
Figure 6:
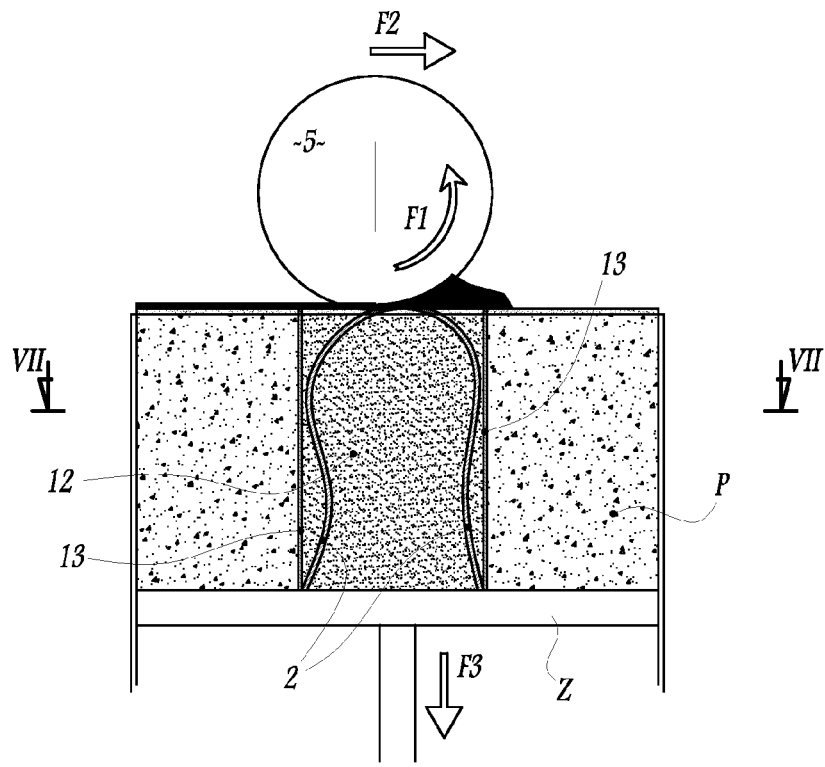
Figure 7:
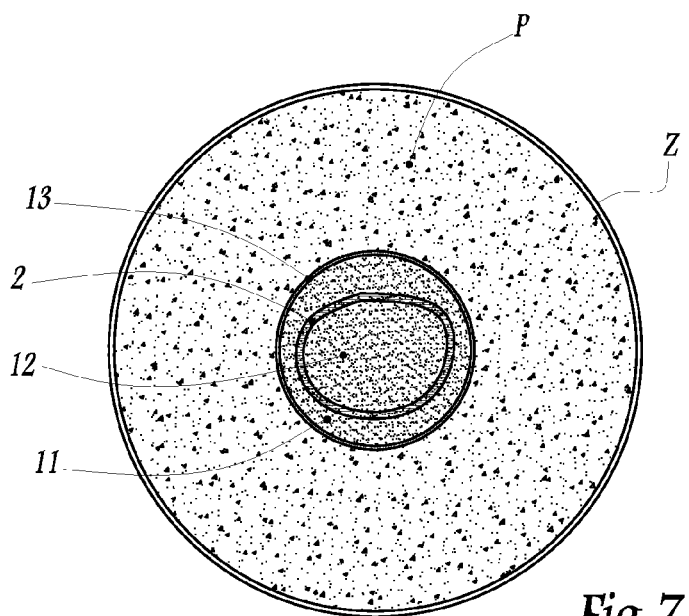

FIG. 7 is a section along the plane VII-VII in FIG. 6, at the same scale, of an object produced in this way, before a finishing step, and FIG. 8 is a view, at a larger scale, of the circled area VIII in FIG. 2, showing defects appearing in an undercut part, during the production of a wall, according to a method according to the prior art.

FIG. 1 illustrates schematically the production of an object 1 from a powder P or a powder mixture, which is either metallic or ceramic. This object 1 has, in the example, a constituent part 2, otherwise referred to as a thin wall, i.e. a wall less than 1 mm thick. The object 1 has a relatively large volume in relation to the cross-section thereof. Such an object 1 is hollow, the internal volume thereof representative almost all the total volume thereof. It displays overhanging, i.e. undercut, areas 3 and 4 of the wall 2 thereof.

Figure 4:
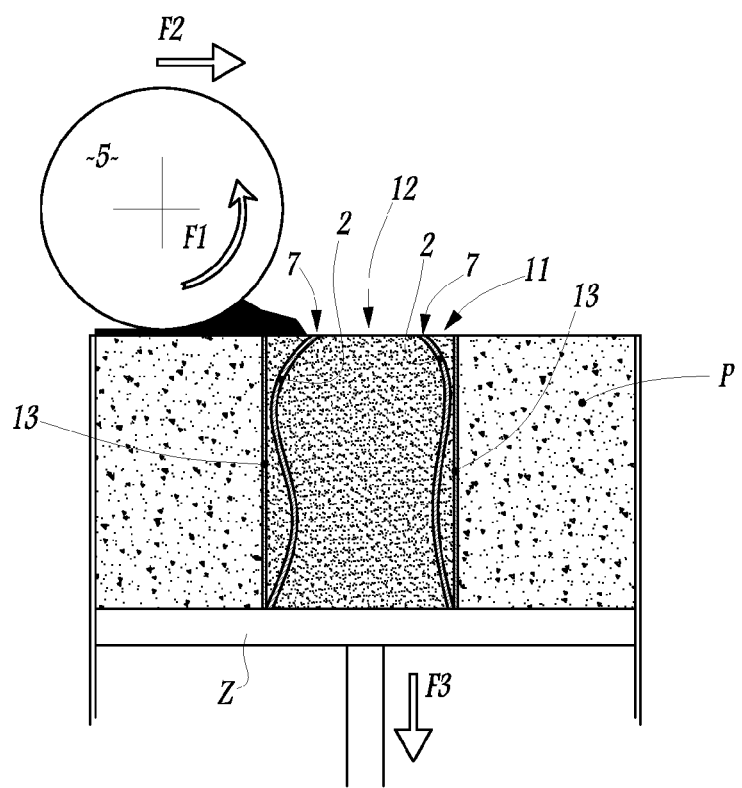

A cylinder 5, rotatably mounted in the direction of the arrow F1 and illustrated in FIGS. 1, 4 and 6, spreads and/or compacts the powder P, advantageously in a plurality of passages, along the direction of the arrow F2.

Alternatively, further spreading members may be envisaged, for example a scraper situated downstream from the cylinder, along the direction of the arrow F2.

Alternatively, the outer surface of the cylinder 5 is not smooth but grooved to enable the pick-up of the powder P, the spreading and compacting thereof, according to the technical teaching of EP-A-1 641 580.

This forms on a work area Z a first layer 6 of compacted powder P, wherein the thickness generally varies from 1 µm to 100 µm, preferentially from 15 µm to 40 µm. This work area Z is formed by a base plate, translatably movable along the direction of the arrow F3. This base plate is lowered as the layers of powder P are formed, so that the cylinder 5 can spread and compact the powder P.

Some areas of this layer 6 of powder P will be sintered, i.e. solidified by the thermal energy provided by a laser 8. The areas 7 solidified constitute the walls 2 of the finished object 1.

FIG. 2 illustrates the so-called laser treatment or sintering step to produce an object 1 produced with a method known from the prior art. The action of the laser 8, illustrated schematically, on this spread and compacted layer 6 gives rise to the appearance of defects 9 and 10 on the object 1.

A first type of defects consists of deformations 9 of the thin wall 2. These deformations 9 arise from the release of localised stresses, due to the temperature rise by several hundred degrees Celsius of a given region of the wall 2, under the action of the laser 8.

A further type of defects, represented in FIG. 2, is illustrated by the burrs 10 extending inside and outside the object 1. These burrs 10 appear in the case of undercutting, i.e. an area where the wall 2 is overhanging in relation to the powder P occupying part of the volume of the object. There is a difference in thermal conductivity between the layer of powder P already treated, i.e. solidified and forming a section of a constituent part 2 of the object 1 and the powder P to be treated, i.e. non-solidified. The latter has a lower thermal conductivity than that of the sintered powder, i.e. the solidified material, due to the presence of gas for example air or nitrogen, between the powder particles. In other words, the material in powder form is more refractory than the solidified material. In this way, the action of the laser 8 on the powder also has an impact beyond the area whereon it is directed, giving rise to a solidification of the powder P situated in the immediate environment of the area targeted by the laser 8. If the powder P is situated under the wall 2 and in contact therewith, as represented in FIG. 8, this gives rise to defects as represented in FIGS. 2 and 8, for example burrs 10 situated at the free ends of the wall 2 and oriented towards the inside and outside of the object. As illustrated in FIG. 8, the deformations 9 appear between the powder P and the wall 2, on the surface 20 thereof oriented towards the inside of the object. During the treatment with the laser 8, the thermal energy is transmitted from the upper layer 60 of powder P, by the wall 2, to the powder situated under the wall 2. Some of this powder P is then solidified, in a random and uncontrolled manner, giving rise to deformations 9. In other words, the inner surface 20 of the wall 2 is not regular. If the free end of the thin wall 2 is subjected to the action of the laser 8, to solidify a further layer 60 of powder P, deformations forming burrs 10 appear, due to the thinness of the wall 2.

In the presence of any defects and/or deformations 9 and 10, the passage of the cylinder 5 to spread a further layer of powder P on the previously sintered layer 6 is disrupted by the lack of surface evenness and the presence of an obstacle in the layer of solidified powder. For this reason, this new layer is poorly spread and/or compacted, or even not compacted at all. Furthermore, the roll may be impeded or inhibited in the translation movement thereof. The burrs 10 may further alter the surface of the cylinder 5. Moreover, these defects and/or deformations 9 and 10 form a structural weak point in the finished object 1.

The invention consists, using the same powder P or powder mixture, in spreading same using the same spreading member 5, compacting same and treating using the laser 8 to produce an object 1 having thin walls and/or with undercuts with no defects and/or deformation.

Figure 3:
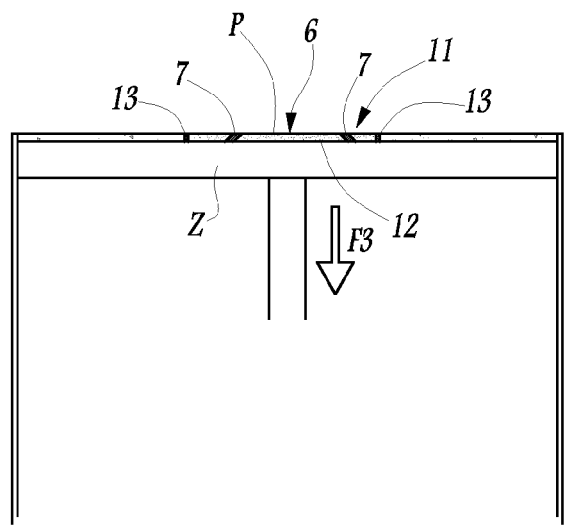

For this purpose, as represented in FIG. 3, during a first step, a first layer 6 of powder P is spread, compacted and treated with the laser 8. In this layer 6, as above, a first area 7 is solidified corresponding to the production in cross-sections, by means of successive layers, of the wall 2 of the object 1 to be produced, i.e. a section of a constituent part of the object.

In a second step, at least one second area of the powder P, not constituting the finished object 1, i.e. this second area is not part of the object, is solidified. In the example, two such second areas, referenced 11 and 12, are envisaged. These areas 11 and 12 are adjoining in contact or, alternatively, adjoining without contact, with in this case, a gap in the region of one tenth of a millimeter between the areas 11 and 12 and the area 7. The dimensions of these areas 11 and 12 are substantially greater than the dimensions of the area 7. The areas 11 and 12 are, in this instance, formed in the powder P on either side of the area 7. In other words, the areas 11 and 12 are situated on either side of a section of the wall 2 to be produced. During this second step, the operating parameters of the laser 8 are different. They are suitable such that the solidification of the powder P in the areas 11 and 12 is not complete. In other words, it consists of producing the areas 11 and 12 wherein the powder P is solidified, but with a lower density and/or higher porosity than the area 7 where the solidified powder P forms the wall 2. In this way, these areas 11 and 12 are structurally weaker than the area 7 intended to form the walls of the object. Nevertheless, they are sufficiently strong, due to the treatment using the laser 8, otherwise known as sintering, to form a support or a reinforcement for the walls 2 produced during the implementation of the method. Even though the areas 11 and 12 are weaker than the areas 7, they are more stable than the powder P not treated with the laser 8.

To obtain the areas 11 and 12, one of the solutions is found in that the thermal energy supplied to the powder P in the second areas 11 and 12 is less than the energy supplied to the powder P to solidify the first area 7.

This difference in thermal energy is obtained, for example, using a lower laser powder, and/or using the same laser power but with a higher scanning speed. Advantageously, the laser 8 is used with a lower power and a higher scanning speed.

In further embodiments not illustrated, the variation in thermal energy is obtained by further means known per se, for example by modulating the trajectories of the laser beam.

For example for metallic powders P, the difference in energy using during the sintering of the areas 7 and the areas 11 and 12 is between 10 and 20% of the thermal energy of the laser beam required to sinter the areas 7.

In one embodiment not shown, two lasers are used, which are either different or identical but set differently, so as to simultaneously produce the areas 7 and the areas 11 and 12. In other words, the sintering steps of the areas 7, 11 and 12 are not successive but simultaneous. Such a solution makes it possible to save time producing the object.

In any case, the laser(s) used advantageously has/have a fixed wavelength. In other words, a single wavelength is used for sintering the areas 7, 11 and 12 of the layer 6 of powder P.

In one preferred embodiment, simplifying the implementation of the method, the powder or powder mixture, forming the layer 6, is homogeneous on the entire layer.

In one further alternative embodiment not illustrated, the powders or powder mixtures, constituting the areas 7 and the areas 11 and 12 are not the same. In this case, the very nature of the powder forming the areas 11 and 12 contributes to the structural weakness thereof.

Figure 5:
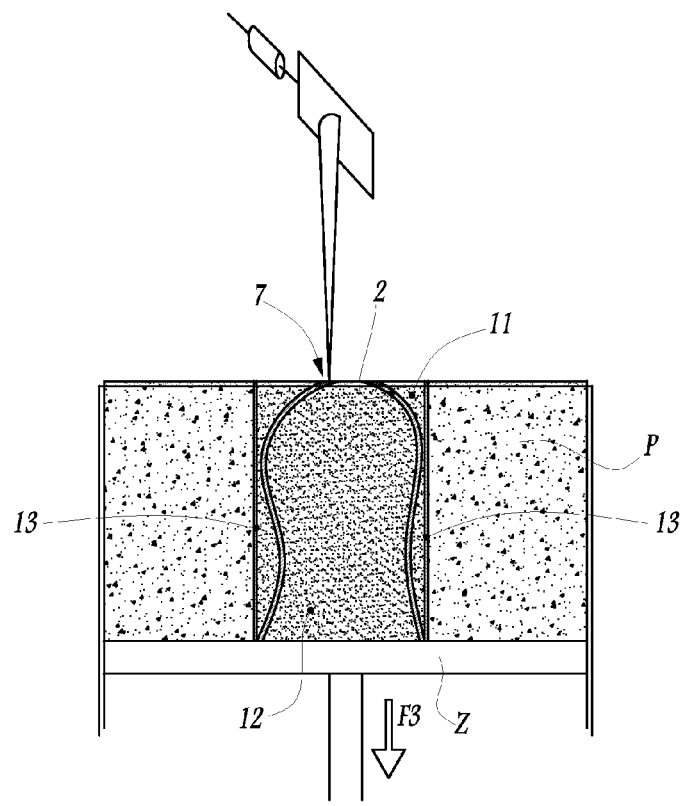

FIGS. 4 to 6 illustrate an embodiment comprising a further step for sintering the powder P in an area 13 not constituting the object 1, which is different and separate from the areas 11 and 12. This area 13, once sintered, defines a wall encompassing the other areas 11, 12 and 7. In practice, the sintering of the area 13 is performed according to the various options listed above in respect of the areas 11 and 12.

In other words, the sintered areas corresponding to the object 1 are encompassed by a wall. This wall 13 is sintered under conditions optionally different to those applied during the sintering of the areas 7, 11 and 12. In this instance, the conditions are suitable for the mechanical resistance of the wall 13 to be intermediate between that of the wall 2 and the areas 11 and 12. Alternatively, the mechanical resistance of the wall 13 is identical to that of the wall 2. In this way, the wall 13 protects and reinforces the support created by the areas 11 and 12 while being easy to destroy during the finishing of the object 1. The wall 13 is particularly useful when producing a large object.

This third area 13 thus forms a stop wall. For this, it defines an object having a simple geometric shape, particularly a cylindrical shape, optionally with a circular base, according to the geometry of the object 1.

In FIGS. 4 to 7, the difference in the filling lines between the areas 11 and 12 situated radially inside the wall 13 and the area situated outside the wall represents the difference in state of the powder, between the areas 11 and 12, where it is treated with the laser 8, and outside, where it is not solidified.

As illustrated in FIG. 4, the spreading of a further layer of powder P on these previously sintered layers is not impaired by the presence of the defects.

As illustrated in FIG. 5, solidification using the laser 8 does not induce any defects or deformations of the walls 2 since said walls are held firmly in place by the areas 11 and 12 and 13 having a lower resistance which will absorb, in a relatively similar manner, the heat emitted by radiation during the treatment of the first area. As illustrated in FIG. 5, during a final passage of the laser 8, the powder P is sintered to finish the wall 2, by closing the interior volume of the object 1.

In this way, when observing an object 1 in a sectional view as in FIG. 7, said object exhibits a series of concentric areas. The first area, from the centre, is an area 12 of lower resistance occupying the interior volume of the object. A further thin area defines the walls 2 of the object 1. A further area 13, which is also thin, encompasses the object 1. An area 11 of lower resistance similar to the area 12 is situated between the walls 2 and 13.

When the object 1 is finished, it is simply necessary to remove the areas 11 and 12 and wall 13 of lower resistance by means of techniques known per se, for example by means of micro-sanding, blasting with micro-beads, brushing or using a water jet. These areas 11, 12 and 13, by definition, are degraded and damaged by the micro-sanding or micro-bead blasting well before the treatment reached or degrades the walls 2 of the object 1.

Using this method, objects having thin walls and/or complex geometric shapes particularly having numerous interior volumes are produced. This method is easy to apply to various types of powders, whether they are metallic or ceramic powders, regardless of the shapes of the object.

Compacting each layer of powder makes it possible to obtain sufficiently resistant sintered areas 7, 11, 12 and 13 having a controlled thermal conductivity, thus preventing manufacturing defects.

This method may be used with various existing facilities for solidifying powder by treating thin layers of powder using a laser, insofar as it is possible to set the values of the thermal energy supplied by the laser.

Using two powders of different types, one to produce the reinforcing areas 11, 12, 13 and one to produce the object 1, makes it possible, if the object is made of a rare and/or costly material, to save said material.

Such a method is suitable for producing fine objects and/or objects having a complex shape.

The invention claimed is:

1. A method for manufacturing an object by powder solidification, comprising at least steps consisting of:
   a) depositing, using a spreading member, a layer of at least one powder or powder mixture, that is metallic or mineral, on a work area that is planar,
   b) compacting, using a compacting member, the layer deposited in step a),
   c) solidifying, using a laser, a first area of the layer compacted in step b), said first area corresponding to a section of a wall constituting the manufactured object,
   d) solidifying at least one second area of the layer compacted in step b), said at least one second area being in contact with the first solidified area and being solidified in step d) with suitable solidification conditions such that the at least one second solidified area is less mechanically resistant than the first solidified area,
   e) repeating the group of the steps a) to d) until the object is finished such that at each repetition of the group of the steps a) to d), a new layer of the at least one powder or powder mixture is first deposited, by implementation of step a), on the layer resulting from the previous repetition of the group of the steps a) to d), and then compacted, by implementation of step b), and solidified by implementation of steps c) and d),
   f) after step e), removing the second solidified areas with respect to the first solidified areas by applying mechanical stress to which the first solidified areas are resistant and to which the second solidified areas do not resist.

2. The method according to claim 1, wherein step d) is performed after step c).

3. The method according to claim 1, wherein step d) is performed simultaneously with step c), using a different laser to the laser used in step c).

4. The method according to claim 1, wherein in the layer deposited in step a), the at least one powder or powder mixture is homogeneous on the entire layer.

5. The method according to claim 1, wherein the at least one powder or powder mixture includes a first powder or powder mixture and a second powder or powder mixture that is different from the first powder or powder mixture, the first area being formed from the first powder or powder mixture and the at least one second area being formed from the second powder or powder mixture.

6. The method according to claim 1, wherein the method comprises a further step consisting of, during a step g), after step c), solidifying a third area of the layer compacted in step b), this third area being solidified in step g) with suitable solidification conditions such that the third solidified area is less mechanically resistant than the first solidified area and is more mechanically resistant that the at least one second area, wherein, during step e), step g) is also repeated at each repetition of the group of the steps a) to d), and wherein, during step f), the third solidified areas do not resist to applied mechanical stress and are thus removed.

7. The method according to claim 6, wherein, during step g), the third area is solidified by using the laser used in step c) and an intermediate thermal energy is supplied to the third area, using a thermal energy supplied by the laser, which is less than that supplied to solidify the first area in step c) and which is greater than that supplied to solidify the at least one second area in step d).

8. The method according to claim 6, wherein step g) is performed simultaneously with step c), using a different laser to the laser used in step c).

9. The method according to claim 6, wherein the at least one powder or powder mixture includes a first powder or powder mixture and a second powder or powder mixture that is different from the first powder or powder mixture, the first area being formed from the first powder or powder mixture, and the at least one second area and the third area being formed from the second powder or powder mixture.

10. The method according to claim 1, wherein, during step f), the second areas are removed from the first areas by means of micro-sanding, micro-bead blasting, brushing or using a water jet.

11. The method according to claim 1, wherein, during step d), the at least one second area is solidified by using the laser used in step c).

12. The method according to claim 3, wherein, during the steps c) and d), the lasers are used with a single wavelength to solidify the first area and the at least one second area.

13. The method according to claim 6, wherein, during step f), the third areas are removed from the first areas by means of micro-sanding, micro-bead blasting, brushing or using a water jet.

14. The method according to claim 11, wherein during step d), a lower thermal energy is supplied to the at least one second area using a lower thermal energy supplied by the laser than that supplied for solidifying the first area in step c).

15. The method according to claim 11, wherein, during the steps c) and d), the laser is used with a single wavelength to solidify the first area and the at least one second area.

16. The method according to claim 14, wherein during step d), the laser is used with a lower power than that of the use of the laser in step c).

17. The method according to claim 14, wherein during step d), the laser is used with a higher scanning speed than that of the use of the laser in step c).

* * * * *